United States Patent [19]

Schlemmer et al.

[11] Patent Number: 4,730,920

[45] Date of Patent: Mar. 15, 1988

[54] OPTOELECTRONIC STADIA

[75] Inventors: Harald Schlemmer, Karlsruhe; Rainer Stuhlmüller, Bruchsal, both of Fed. Rep. of Germany

[73] Assignee: Nestle & Fischer, Dornstetten, Fed. Rep. of Germany

[21] Appl. No.: 842,819

[22] Filed: Mar. 24, 1986

[30] Foreign Application Priority Data

Apr. 9, 1985 [DE] Fed. Rep. of Germany ....... 3512708

[51] Int. Cl.⁴ .................... G01C 3/08; G01B 11/26
[52] U.S. Cl. .......................... 356/4; 33/293; 33/294; 356/152
[58] Field of Search ............ 33/293, 294; 356/4, 356/152

[56] References Cited

U.S. PATENT DOCUMENTS

| | | | |
|---|---|---|---|
| 3,539,995 | 11/1970 | Branot | 250/578 |
| 3,564,257 | 2/1971 | Berry et al. | 356/141 |
| 3,708,671 | 1/1973 | Story | 356/152 |
| 3,894,230 | 7/1975 | Rorden et al. | 356/400 |
| 4,030,832 | 6/1977 | Rando et al. | 356/4 |
| 4,032,801 | 6/1977 | Fulkerson | 356/4 |
| 4,200,787 | 4/1980 | Carson | 356/152 |

FOREIGN PATENT DOCUMENTS 0204410 12/1982 Japan ..................... 356/4

Primary Examiner—Stephen C. Buczinski
Attorney, Agent, or Firm—Bachman & LaPointe

[57] ABSTRACT

An optoelectronic stadia is proposed, which is intended for a levelling system with a rotary laser. The stadia has at least one vertical row of light sensitive diodes, which are electrically connected in matrix form. One diode pair in each case forms one matrix node. The column signals and line signals are decoded and evaluated in an evaluation apparatus and the measured result is supplied to a display means. The matrix arrangement of the diodes leads to a very simple construction with relatively few components.

10 Claims, 5 Drawing Figures

OPTOELECTRONIC STADIA

BACKGROUND OF THE INVENTION

The present invention relates to an optoelectronic stadia, measuring or surveyor's rod. The stadia is intended for a surveying system with a rotary laser beam. The stadia is set up at a distance from the rotary laser, so that the laser beam periodically strikes the stadia.

Tests have already been carried out with stadias having a plurality of photoelectric cells on their sides and which were connected via an analog network to a display. The tolerances of the components, particularly the precision resistors used, led to such serious disadvantages tht such solutions were not practicable. DE-OS No. 33 21 990 proposes a laser-optical surveying system, in which a laser beam revolves in a horizontal plane and strikes a stadia provided with a reflecting code system. The coded, reflected light signal is fed to photodetectors, so as to permit an electronic evaluation. This known levelling system has a very complicated construction and requires highly accurate adjustment, not only for the laser beam but also for the photodetectors.

SUMMARY OF THE INVENTION

The problem of the present invention is to provide an optoelectronic stadia for a surveying system with a rotary laser beam, which has a relatively simple construction and also an adequate resolution.

This problem is solved by the present invention with an optoelectronic stadia for a surveying system with rotary laser beam, which is provided on one side with a plurality of optoelectronic elements, which are connected via an evaluation means to a display, wherein the circuit arrangement of the optoelectronic elements forms at least one matrix, while the optoelectronic elements are arranged in closely spatially juxtaposed manner in at least two vertical rows and wherein in each case one line signal and one column signal together form a given node of the matrix and therefore identify a specific height value. To one side of the stadia is fitted at least one vertical row of optoelectronic elements, epreferably light emitting diodes (LED's), which are jointly or stagewise connected to a matrix. In each case two adjacent optoelectronic elements form a matrix node. The optoelectronic elements can be, for example, constituted by light emitting diodes (LED's) arranged in pairs and having a vertical center-to-center spacing of 5 mm, so that the resolution for a stadia constructed in this way is 5 mm, which is perfectly adequate for surveying work on building sites. A higher resolution can naturally be achieved b a denser arrangement of the light emitting diodes (LED's). Two adjacent optoelectronic elements are contacted by the laser beam, so that a line and a column signal are produced, which identify a specific matrix node and consequently a specific height reading. The column and line signals are evaluated in an evaluation apparatus and the in each case measured height value or height difference is preferably digitally displayed by means of a display. Evaluation takes place directly in the stadia, so that transmission errors to remote photoelectric cells is avoided. The optoelectronic elements can be arranged stagewise on different circuit boards, which in each case form a matrix arrangement. Such a modular construction makes it possible to equip stadias having different lengths in a simple manner with a corresponding number of circuit boards with optoelectronic elements. For this purpose, the circuit boards have plug connections permitting simple plugging together.

The data lines for the line or column signals of several ciccuit boards are preferably connected in parallel and in addition the circuit board whose optoelectronic elements are struck by the laser beam emits a signal, which identifies the circuit board. This leads to a simple electrical construction for the complete arrangement. The matrix-like circuit arrangement for the optoelectronic elements has the advantage of only requiring limited circuitry expenditure for an adequately accurate height measurement. The stadia can also be equipped with a microprocessor, which permits a universal evaluation of several measured values, optionally on call.

The use of light emitting diodes as the optoelectrical elements provides an inexpensive solution. The light emitting diodes can also be chosen in such a way that their spectral light sensitivity is adapted to the light emitted by the laser. This makes it possible to greatly reduce disturbing light influences by sunlight or other light sources. It is also possible to cover the light emitting diodes with a per se known lamellar, light transmitting foil, whose lamellas limit the light incidence angle. For the purpose of filtering out background brightness, the amplifier elements used for the columns and rows of the matrix arrangement can be provided with electrical filter means, which are permeable for short-duration voltage changes.

A particularly advantageous further development of the invention provides for the bottom of the stadia being extendable by means of a rigid or retractable leg and a signal identifying the particular length of the leg is supplied to the evaluation apparatus and the measurement correspondingly corrected. The length of the leg is preferably the same as the length of a portion of the optoelectronic elements housed on a circuit board, or an integral multiple of said length. This leads to the advantage that when using such an extension by a rigid or extendable leg only one additional signal has to be produced, which identifies the length of the leg used. This additional signal can be processed in the same way as the other signals identifying the different circuit boards.

Advantageous further developments of the invention are characterized in the subclaims.

BRIEF DESCRIPTION OF THE DRAWINGS

The invention is described in greater detail hereinafter relative to non-limitative embodiments and the attached drawings, wherin show.

DETAILED DESCRIPTION OF THE PREFERRED EMBODIMENTS

Figure 1:
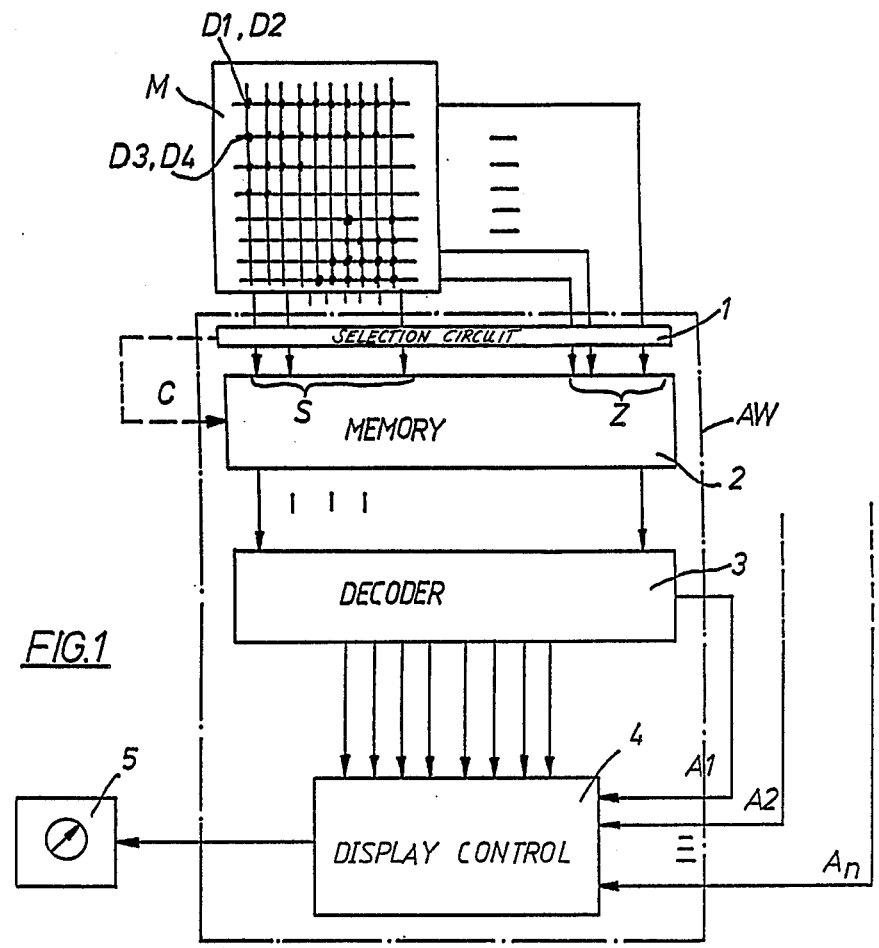
FIG. 1 A block diagram for the electrical circuit of the stadia according to the invention.

The block circuit diagram shown in FIG. 1 comprises a matrix-like arrangement M of optoelectronic elements, whose column signals S and line signals Z are supplied by means of a selection circuit 1 to a memory 2. At the output side, memory 2 is connected to a decoder 3, which can also incorporate a multiplier. The coded and optionally multiplied binary test signal is supplied from decoder 3 to a display control 4, which is connected to the output side to a display means 5. The display control determines the difference between a preceding measured value (back view) and a succeeding measured value (forward view) or transfers the just measured value to the display means 5.

Display control 4 also receives further signals A 1 to A n, which can be looked upon as stage signals or circuit board signals. These signals are necessary if the optoelectronic elements form several matrix arrangements in stagewise manner. Thus, for example, in each case 128 optoelectronic elements can be combined to form a matrix M and can be arranged in two rows on a separate circuit board. Further circuit boards with in each case 128 optoelectronic elements can be formed into a long row. If two horizontally adjacent optoelectronic elements are struck by the laser beam, then the particular circuit board emits a corresponding circuit board or stage signal. The data lines for the column and line signals can then run parallel of all the circuit boards, so that it is e.g. only necessary to supply the memory with 8 data lines for the column signals and 8 data lines for the line signals.

Selection circuit 1, memory 2, decoder 3 and display control 4 form an evaluation apparatus AW, which is arranged centrally in the stadia. The circuit 1 ensures that when a column signal appears, the corresponding line is freed and the other lines for column signals are blocked. The same procedure occurs with the lines for the line signals Z. This has the advantage that only one column signal S and one line signal Z can be associated with one another. A superimposing of further column signals or line signals with the resulting errors is consequently avoided. Moreover, selection circuit 1 only supplies a take-over or acceptance signal C to memory 2 when a column signal S and a line signal Z occur within a given time. The memory then accepts these signals and passes same to decoder 3 for conversion into a corresponding digital test value.

Figure 2:
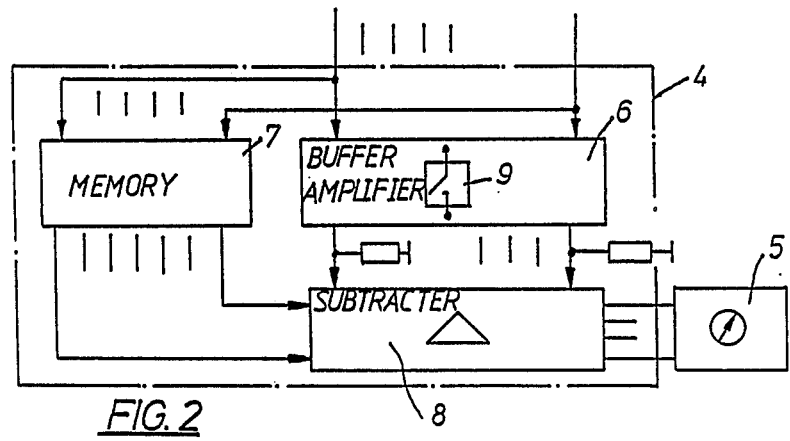
FIG. 2 An embodiment of a display means.

FIG. 2 shows an embodiment for the display control 4, which here comprises a buffer amplifier 6, a further memory 7 and a subtracter 8. Memory 7 can e.g. store a first test value (back view), which is supplied to subtracter 8, while the buffer amplifier 6 is blocked. This state is indicated in the drawing by the open switch 9. In this state, a signal corresponding to the value "0" is applied to the upper inputs of the subtracter, so that the difference between the storage content and the 0 signal is the same as the storage content. The display means 5 in this case displays the value filed in memory 7.

However, if buffer amplifer 6 is opened, then a second test value (forward view) can reach the upper inputs of subtracter 8, so that the difference between the value stored in memory 7 (back view) and the current tast value (forward view) can be formed in subtracter 8. The difference corresponds to the measured height difference, which in this way can be displayed in display means 5.

Figure 3:
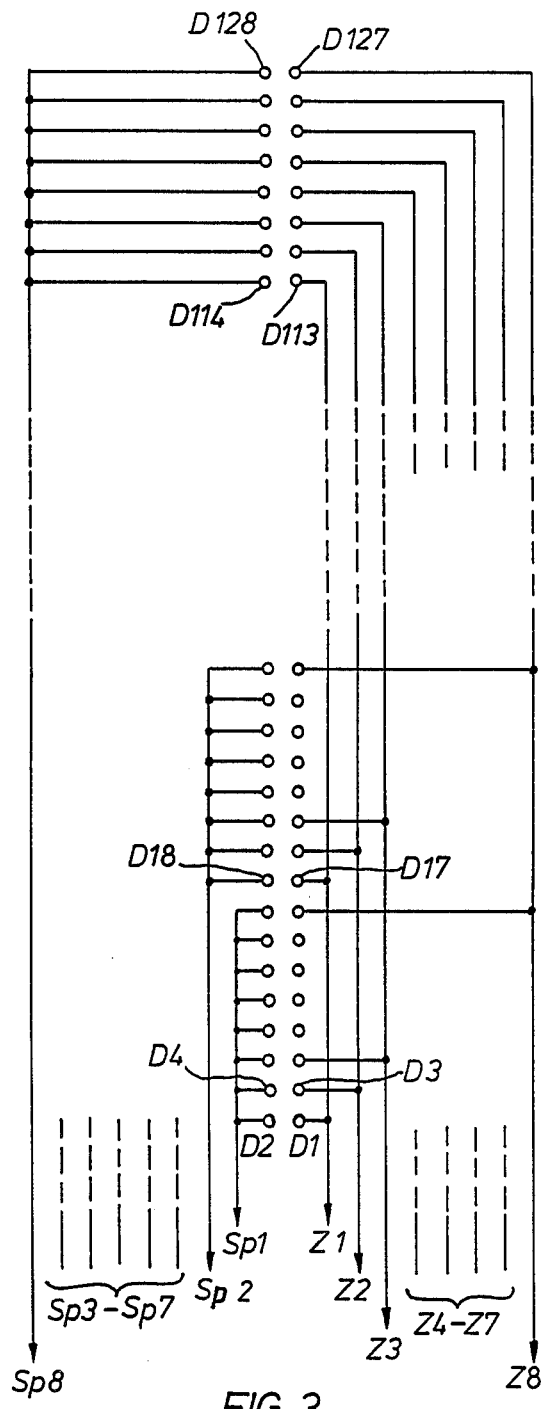
FIG. 3 The basic arrangement of the different optoelectronic elements of a matrix.

FIG. 3 shows the basic arrangement of the optoelectronic elements which are in two rows and which are shown here in simplified spatial arrangement in the form of light emitting diodes D1-D128. The electrical links are provided by lines Z1-Z8, Sp1-Sp8. The diodes D1, D17 ... D113 belonging to a row Z1 are clearly spaced from one another and in eacah case two adjacent diodes, e.g. D17 and D18 form a matrix node.

The laser beam is sufficiently wide to strike at least two adjacent diodes. If e.g. diodes D3 and D4 are struck by the laser beam, then a column signal is produced ont he first column Sp1 and a row signal on the second row Z2. These two signals are converted in decoder 3 into a binary coded signal, which defines a corresponding height. The also occurring stage signals A1, A2 to An indicate which height must still be added.

Figure 4:
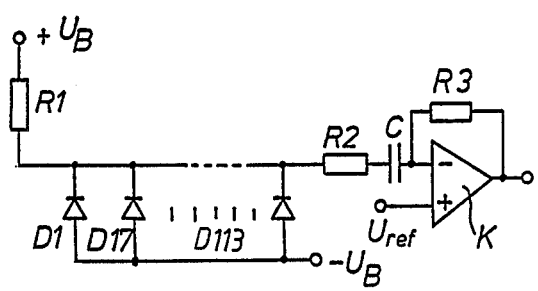
FIG. 4 The electrical circuit diagram for a line or column circuit.

FIG. 4 provides the circuit arrangement for the first row Z1. The positive operating voltage $+U_B$ is supplied across a resistor R1, the parallel connected diodes D1, D17 to D113 and across the series circuit of a further resistor R2 and a capacitor C to the negative input of a comparator K. The output of the comparator is fed back across a further resistor R3. A reference voltage $U_{ref}$ is applied to its positive input. The output of comparator K supplies the row signal Z for row Z1 if one of the diodes D1, D17 to D113 is activated by the laser beam. The anodes of these diodes are jointly connected to the negative operating voltage $-U_B$.

Figure 5:
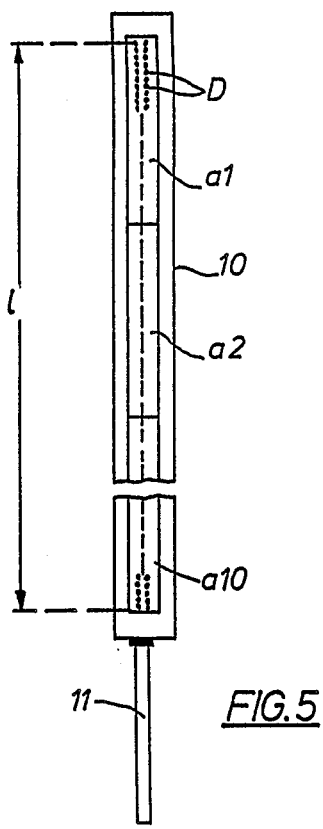
FIG. 5 The simplified front view of a stadia according to the invention.

FIG. 5 shows the basic external construction of a stadia 10. Diodes D are partly shown as dots and pass over a measurement range of length 1. This length can e.g. be 3.20 m, so that 10 stages a 1-a 10 with a length of in each case 32 cm are required. Each of these stages a 1-a 10 can have in 5 mm spacings a total of 128 diodes or other optoelectronic elements. At the lower end of stadia 10 a leg 11 is provided for extension purposes and it exactly corresponds to the length of one of the stages a 1-a 10. A corresponding correction of the measurement when using the leg compared with a measurement without the leg 11 can be simply carried out in electronic manner. The upper end of leg 11 can for this purpose be constructed in such a way that a switch is operated for producing an electrical signal. This signal is evaluated in evaluation apparatus AW in the form that when the signal is present the length of leg 11 is added to the measured result.

The indication or display of the measured results can e.g. take place on the back of stadia 10 and/or can be supplied by an output bush to an external display or evaluation means.

Light emitting diodes are preferably used for converting the laser beam striking the stadia into an electrical signal, said diodes changing their resistance in the case of instant light. Thus, these diodes can bring about an optoelectrical conversion. However, other photoreceivers can also be used. It is also possible to replace the arrangement of the diodes in two rows, by the nesting thereof in one row.

What is claimed is:

1. An optoelectric stadia for a surveying system with a rotary laser beam which comprises: a plurality of optoelectronic elements provided on one side of the stadia; display means; and evaluation means connecting said optoelectronic elements to said display means; wherein said optoelectronic elements are connected to a circuit arrangement which defines at least one matrix having at least two column components and at least two line components, wherein the optoelectronic elemtns are arranged in at least one vertical row with each said row being defined by two adjacent columns of said elements and with two adjacent optoelectronic elements in said two columns forming a matrix node, each said row being subdivided into stages of the same length with each stage forming a modular arrangement; and wherein a first signal representative of a line component of said matrix and a second signal representative of a column component of said matrix are generated when the elements forming one of said matrix nodes are contacted by said laser beam, said signals being used to identify said one matrix node and to identify a height value.

2. A stadia according to claim 1, wherein an additional stage-identifying signal is emitted to identify the stage whose elements have been contacted by said laser beam.

3. A stadia according to claim 2, wherein data lines for at least one of the column signals and the line signals of all said stages are connected in a parallel feedback-free manner and separate data lines to the evaluation means are provided for each stage-identifying signal.

4. A stadia according to claim 1, wherein the optoelectronic elements are light emitting diodes, and wherein two of said diodes define each matrix node.

5. A stadia according to claim 1, wherein the evaluation means contains a memory which is used for storing measured height values and a subtracter and wherein at least one of the difference between a stored and an instantaneous measured value and the instantaneous measured value is displayed.

6. A stadia according to claim 1, wherein the evaluation means contains a computer which evaluates several measured values and displays the results on the display means.

7. A stadia according to claim 1, wherein the distance between the centers of two adjacent optoelectronic elements forming a matrix node is smaller than the laser beam width.

8. A stadia according to claim 1, wherein electrical filters only permeable for higher frequency voltage changes are associated with the column and line circuit components of said matrix.

9. A stadia according to claim 1, wherein the optoelectronic elements have a spectral light sensitivity adapted to the light spectrum emitted by the laser beam.

10. A stadia according to claim 1, wherein the evaluation means includes a selection circuit connected to a memory, a decoder connected to said memory, and a display control connected to said decoder.

* * * * *